United States Patent [19]

Saam et al.

[11] Patent Number: 5,492,993
[45] Date of Patent: Feb. 20, 1996

[54] STRAIN-CRYSTALLIZING POLY(METHYL(3,3,3-TRIFLUOROPROPYL)-SILOXANE) ELASTOMERS AND METHODS FOR MAKING

[75] Inventors: John C. Saam; Chung M. Kuo, both of Midland, Mich.

[73] Assignee: Dow Corning Corporation, Midland, Mich.

[21] Appl. No.: 190,953

[22] Filed: Feb. 3, 1994

[51] Int. Cl.$^6$ .................................................. C08G 77/08
[52] U.S. Cl. ................... 528/15; 528/17; 528/18; 528/14; 528/37; 528/42
[58] Field of Search .................. 528/14, 37, 42, 528/15, 18, 17

[56] References Cited

U.S. PATENT DOCUMENTS

| | | |
|---|---|---|
| 3,337,497 | 8/1967 | Bostick . |
| 3,575,921 | 4/1971 | Lee . |
| 5,401,822 | 3/1995 | Collins et al. .............. 528/42 |

OTHER PUBLICATIONS

Curtis et al., Polym. Preprin., Div. Polym. Chem., Am. Chem. Soc., 25 (1984) 1.
Momper et al., Polym. Commun. 31 (1990) 186.
Rubber Chemistry and Technology, Rubber Reviews for 1979, vol. 52 (No. 3) pp. 447–454.

*Primary Examiner*—Melvyn I. Marquis
*Attorney, Agent, or Firm*—William F. Boley

[57] ABSTRACT

Strain-crystallizing poly{methyl(3,3,3-trifluoropropyl)siloxane} elastomers and methods for their making. The process comprises the cross-linking of cis stereoregular polymers prepared by reacting isomers of 1,3,5-trimethyl-1,3,5-tris(3',3',3' -trifluoropropyl)cyclotrisiloxane, where at least 30 percent of the isomers are of cis configuration, in the presence of an aprotic polar promoter and a lithium compound. The lithium compound initiates ring opening and polymerization of the isomers without affecting the steric arrangement of the leomars. Elastomers prepared by cross-linking these cis stereoregular polymers have sufficient cis 3,3,3-trifluoropropyl substitution to allow the elastomers to strain crystallize and provide reinforcement to the elastomers at typical use temperatures.

12 Claims, No Drawings

STRAIN-CRYSTALLIZING POLY(METHYL(3,3,3-TRIFLUOROPROPYL)-SILOXANE) ELASTOMERS AND METHODS FOR MAKING

BACKGROUND OF INVENTION

The present invention is strain-crystallizing poly{methyl(3,3,3-trifluoropropyl)siloxane} elastomers and methods for their making. The present process comprises the cross-linking of cis stereoregular polymers prepared by reacting isomers of 1,3,5-trimethyl-1,3,5-tris(3',3',3'-trifluoropropyl)cyclotrisiloxane, where at least 30 percent of the isomers are of cis configuration, in the presence of an aprotic polar promoter and a lithium compound. The lithium compound initiates ring opening and polymerization of the isomers without affecting the steric arrangement of the isomers. Elastomers prepared by cross-linking these stereoregular polymers have sufficient cis 3,3,3-trifluoropropyl substitution to allow the elastomers to strain crystallize and provide reinforcement to the elastomers at typical use temperatures.

Among the general requirements for strain induced crystallization in elastomers are a base polymer with a low glass transition and additionally a melting transition within about 5° C. to 20° C. of use temperature. Typically, strain-induced crystallization in silicon elastomers is not observed because they either show no melting transition or their melting points are so low that the phenomena is precluded at use temperatures.

Described herein are poly{methyl(3,3,3-trifluoropropyl)siloxane polymers having a sufficient degree of stereoregularity such that when they are cross-linked to form an elastomer, the elastomer has a melting transition which allows strain induced crystallization of the elastomer under typical use conditions.

It is known in organosilicon art that cyclic diorganosiloxanes can be polymerized to high polymers by heating them with alkaline catalysts, such as potassium hydroxide or its corresponding siloxane salts. This has become a predominant method for the production of siloxane elastomers. However, during this alkaline polymerization, breaking of the siloxane ring to form high polymers and degradation of high polymers to form cyclics is occurring constantly. Since these polymerization and degradation reactions occur at different rates, the resulting product represents an equilibrium between the two processes. Because of these competing reactions, any polymer which is ultimately formed, by these processes will be atactic lacking significant stereoregularity.

Bostick, U.S. Pat. No. 3,337,497, issued Aug. 22, 1969, describes a process for polymerizing cyclotrisiloxanes that does not result in the equilibrium processes described above. Specifically, Bostick teaches that ordered copolymers can be formed by reacting a mixture comprising a first cyclotrisiloxane, an aprotic solvent, and an organolithium compound and thereafter adding a second cyclotrisiloxane to the process and reacting. Bostick teaches the stereo-specific opening of cis 1,3,5-trimethyl- 1,3,5-triphenylcyclotrisiloxane when reacted in tetrahydrofuran with n-butyl lithium. Bostick further teaches that the presence of halogens, particularly, fluorine on the aliphatic carbon attached to silicon markedly increases the randomness of the formed polymers and should be avoided in the cyclic polysiloxanes.

Lee, U.S. Pat. No. 3,575,921, issued Apr. 20, 1971, describes the reaction of cis 1,3,5-triphenyl-1,3,5tris( 3',3', 3'-trifluoropropyl)cyclotrisiloxane in the presence of sec-butyl lithium. The product is reported to be a stereoregular material in which one of the cis 3,3,3-trifluoropropyl groups of each trimer is shifted to a trans position.

Curtis et al., Polym. Preprin., Div. Polym. Chem., Am. Chem. Soc., 25 (1984) 1, describe the reaction of cis 1,3,5-trimethyl- 1,3,5-triphenylcyclotrisiloxane in the presence of lithium trimethylsilanolate. The product is reported to be formed by a head-to-tail insertion of the trimer.

Momper et al., Polym. Commun. 31 (1990) 186, teach the polymerization of cis and of trans 1,3,5-trimethyl-1,3,5-triphenylcyclotrisiloxane in the presence of hexamethylphosphoric acid triamide as a promoter and n-butyl lithium as an initiator. Momper et al. concluded that the products obtained through polymerization of the different isomers provided for different tacticities. Momper et al. further noted that some of the products exhibited a finite degree of crystallinity.

The discussed art does not teach the reaction of specific isomers of 1,3,5-trimethyl-1,3,5-tris(3',3',3'-trifluoropropyl)cyclotrisiloxane to prepare polymers with enhanced stereoregularity. Furthermore, the art does not teach that such polymers when cross-linked can have sufficient stereoregularity to allow the elastomer to strain crystallize. Bostick, supra, specifically teaches that the presence of fluorine on the aliphatic carbon attached to silicon markedly increases the randomness of the formed polymers and should be avoided in the cyclic polysiloxanes. Lee, supra, teaches a shift of one of the cis 3,3,3-trifluoropropyl groups to a trans position during reaction in the presence of a lithium compound. Therefore, unexpectedly the present inventors have discovered that 1,3,5-trimethyl-1,3,5-tris(3',3',3'-trifluoropropyl)cyclotrisiloxane can be reacted in the presence of an aprotic polar promoter and a lithium compound to form polymers having cis stereoregularity sufficient to allow elastomers fabricated from the polymers to strain-crystallize.

Polymers prepared by the process described herein can be cross-linked to form elastomers having high elongations to break along with high strengths, without reinforcing fillers. These elastomers can resemble the behavior of natural rubber and should have parallel applications, but with the added advantages that they have an inherent resistance to hydrocarbon solvents as well as to high temperatures and oxidation. The elastomers can be fabricated as room temperature vulcanizing compositions or molded in thermal cure processes. The elastomers may be used, for example, to form gaskets, O-rings, and diaphragms and as sealants and adhesives.

SUMMARY OF INVENTION

The present invention is strain-crystallizing poly{methyl(3,3,3-trifluoropropyl)siloxane} elastomers and methods for their making. The process comprises the crosslinking of cis stereoregular polymers prepared by reacting isomers of 1,3,5-trimethyl-1,3,5-tris(3',3',3'-trifluoropropyl)cyclotrisiloxane, where at least 30 percent of the isomers are of cis configuration, in the presence of an aprotic polar promoter and a lithium compound. The lithium compound initiates ring opening and polymerization of the isomers without effecting the steric arrangement of the isomers. Elastomers prepared by cross-linking these cis stereoregular polymers have sufficient cis 3,3,3-trifluoropropyl substitution to allow the elastomers to strain crystallize and provide reinforcement to the elastomers at typical use temperatures.

DESCRIPTION OF INVENTION

The present invention is strain-crystallizing poly{methyl(3,3,3-trifluoropropyl)siloxane} elastomers and methods for their making.

The process for making the cis stereoregular polymers useful in the present invention comprises: (A) forming a mixture comprising an aprotic polar promoter, isomer of 1,3,5-trimethyl 1,3,5-tris(3',3',3'-trifluoropropyl)cyclotrisiloxane, where at least 30 percent of the isomer is of cis configuration, and a lithium compound comprising at least one lithium atom attached directly to a silicon atom through an oxygen atom; and (B) maintaining the mixture under essentially anhydrous conditions at a temperature at which the lithium compound and the isomer react. In another embodiment of the above described process, a second cyclotrisiloxane (hereafter referred to as organocyclotrisiloxane) comprising about 0.05 to 5.0 mole percent of the cyclotrisiloxanes of the mixture and having at least one reactive group bonded to silicon per organocyclotrisiloxane molecule may be added to the process to form a copolymer. The process may be run in the presence of an aprotic solvent.

The process for making the cis stereoregular polymers employs an aprotic polar promoter. The aprotic polar promoter can be any organic compound that coordinates with the lithium cation and facilitates the reaction, but does not enter into the product. The aprotic polar promoter can be, for example, tetrahydrofuran (THF), ethylene glycol dimethylether (GLYME), dimethylsulfoxide (DMSO), crown ethers such as 15-crown-5, alkyl N-substituted carboxylic amides such as dimethyl foramide; and hexamethylphosphoramide. Preferred is when the aprotic polar promoter is tetrahydrofuran.

It is desirable, but not necessary, that the aprotic polar promoter be added to the process in molar excess in relation to the lithium compound present in the process. The maximum volume of aprotic polar promoter added to the process is not critical and can be as large as desired without excessively diluting the reactants. The aprotic polar promoter may also act as a solvent in the systems to facilitate dispersion of reactants and products.

Isomers of 1,3,5-trimethyl-1,3,5-tris(3',3',3'-trifluoropropyl)cyclotrisiloxane are polymerized in the process. The inventors have found that when cis-$F_3$ comprises about 30 to 100 mole percent of the isomer present in the mixture, elastomers formed from the polymers demonstrate strain-induced crystallization. More preferred is when the cis-$F_3$ comprises about 40 to 85 mole percent of the isomer present in the mixture.

A lithium compound is employed as an initiator in the process for making the cis stereoregular polymers useful in the present process. The lithium compounds useful in the polymerization process are those having at least one lithium atom attached to a silicon atom through an oxygen atom. Such compounds are described, for example, in Bostick, U.S. Pat. No. 3,337,496, issued Aug. 22, 1967, which is incorporated herein by reference. In addition to the lithium compound being monofunctional or difunctional, that is, containing one or two lithium atoms, the lithium compound can be polyfunctional and contain as many as three to five or more lithium atoms attached to silicon by means of an intermediate oxygen atom.

A preferred lithium compound useful in the process for preparing the cis stereoregular polymers is described by formula (1).

In formula (1) each $R^1$ is an independently selected monovalent hydrocarbon radical comprising one to 20 carbon atoms, each $R^2$ is independently selected from a group consisting of $R^1$ and 3,3,3-trifluoropropyl, X is selected from a group consisting of —$R^2$, —$OR^1$, —OH and —OLi, and n is an integer from one to about 50. In formula (1) $R^1$ can be, for example, halogen substituted or unsubstituted alkyls, alkenyls, aryls, cycloalkyls, and aralkyls. $R^1$ can be, for example, methyl, ethyl, propyl, butyl, tert-butyl, isobutyl, hexyl, vinyl, allyl, phenyl, tolyl; 3,3,3-trifluoropropyl, and cyclohexyl. A preferred $R^1$ is selected from a group consisting of methyl and phenyl. In formula (1), $R^2$ can be selected from a group consisting of $R^1$ and 3,3,3-trifluoropropyl, where $R^1$ is as previously described. Preferred is when $R^2$ is selected from a group consisting of methyl, 3,3,3-trifluoropropyl, and phenyl.

In formula (1), substituent X is selected from a group consisting of —$R^2$, —$OR^1$, —OH, and —OLi, where $R^1$ and $R^2$ are as previously described. Those skilled in the art will recognize that X can be selected depending on whether a unidirectional or bidirectional growth of the polymer chain is desired. When X is selected from a group consisting of —$R^2$ and —$OR^1$ growth of the polymer chain will be unidirectional and when X is —OLi or —OH growth of the polymer chain can be bidirectional.

In formula (1), the value n should be less than about 30 percent of the degree of polymerization (dp) of the polymer formed. Preferred is when n is an integer from one to about 50. More preferred is when n is an integer from one to about 10.

Lithium compounds useful in the process for preparing the cis stereoregular polymers can be prepared by standard procedures known in the art as described, for example, in the examples herein and in Bostick, supra. For example, one can mix at least one mole of lithium hydroxide and one mole of an organosilanol of varied organic and hydroxy content, and by heating the mixture at about 50° C. for one-half to 16 hours, produce the desired lithium compound. More specifically, lithium hydroxide or lithium metal can be reacted with, for instance, trimethylsilanol or triphenysilanol to obtain respectively, lithium trimethylsilanolate and lithium triphenysilanolate. By the same process, diorganosilanediol can be reacted with a stoichiometric amount of lithium alkyl under suitable conditions to obtain a dilithium diorganosilanolate. Additionally one can react a dihydroxy chain-terminated polydimethylsiloxane containing for instance, from two to about 50 dimethylsiloxy groups with lithium hydroxide under similar conditions to obtain a dilithium terminated polydimethylsiloxane containing lithium atoms in place of the hydrogen atoms and the same number of dimethylsiloxane groups as was in the dihydroxy terminate polydimethylsiloxane. These procedures can be applied to making lithium compounds containing more than two reactive lithium atoms.

The amount of lithium compound used in the process for making the cis stereoregular polymers is determined by the desired molecular weight of the product polymers and the number of lithium atoms associated with the lithium compound. Generally, each lithium atom of the lithium compound is capable of serving as an initiation site for the stereo-specific ring opening and subsequent polymerization of isomers of 1,3,5-trimethyl- 1,3,5-tris(3',3',3'-trifluoropropyl)cyclotrisiloxane. Therefore, the average number of trimer units in a product polymer chain is the moles of 1,3,5-trimethyl-1,3,5-tris( 3',3',3'-trifluoropropyl)cyclotrisiloxane added to the process divided by the moles of lithium provided to the process by the lithium compound.

The process for making the cis stereoregular polymers is run under essentially anhydrous conditions at a temperature at which the lithium compound and the isomer react. The presence of water is detrimental to the process and should be minimized in the process. By the term "essentially anhydrous" it is meant that the process be run under conditions that minimize the presence of water in the reactants and the reactor. The reactants can be dried by standard methods such as molecular sieves, distillation, and adsorbents. The reactor can be dried for example by applying a vacuum.

The process for making the cis stereoregular polymers can be run at a temperature within a range of about −50° C. to 150° C. and is limited principally by the freezing and boiling point of the aprotic polar initiator and any aprotic solvent used in the process. Preferred is when the process is run at a temperature within a range of about −20° C. to 30° C.

The process for making the cis stereoregular polymers may be run in the presence of an aprotic solvent. The term "aprotic solvent" is intended to mean any organic solvent which has no active protons which may interfere with growing anionic polymerization centers. Any aprotic solvent which is capable of dissolving the polymeric mixture and causing intimate contact of an additional diorganocyclosiloxane with the polymerizing system may be used. These may include such solvents as benzene and methylene chloride. As previously noted, the aprotic polar promoter may serve as a solvent in the process. In a preferred embodiment of the process THF serves as both an initiator and a solvent for the process. A preferred aprotic solvent for the process is methylene chloride.

The poly{methyl(3,3,3-trifluoropropyl)siloxane} polymers useful in the present process are those having sufficient cis stereoregularity to allow elastomers formed from the cross-linked polymers to strain-crystallize. The inventors have found that the polymers possess this property to strain-crystallize when cross-linked, when about 30 to 100 mole percent of the isomer added to the process for making them is the cis-$F_3$ isomer. Preferred is when about 40 to 85 mole percent of the isomer added to the process for making the polymers is the cis-$F_3$ isomer. Further, the inventors believe that although the lithium compound used as initiator maintains the stereoregularity of the 1,3,5-trimethyl- 1,3,5-tris(3',3',3'-trifluoropropyl)cyclotrisiloxane during ring opening, there is equal probability of meso or racemic insertion of the resulting linear trimer into the polymer chain. Therefore for purposes of this invention the mole percent of trifluoropropyl substitution in cis configuration in the polymer products is defined as the mole percent of cis trimer in the product independent of whether the addition to the polymer of the trimer is meso or racemic. The term "cis stereoregular polymer" refers to those polymers having a least about 30 mole percent of trifluoropropyl substitution in cis configuration.

Preferred cis stereoregular poly{methyl(3,3,3-trifluoropropyl)siloxane} polymers useful in the present process when the lithium compound is unidirectional are described by formula (2).

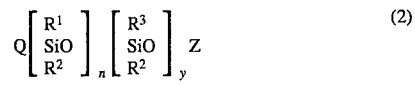  (2)

In formula (2) each $R^1$ is an independently selected monovalent hydrocarbon comprising one to 20 carbon atoms, each $R^2$ is independently selected from a group consisting of $R^1$ and 3,3,3-trifluoropropyl, $R^3$ is 3,3,3-trifluoropropyl, $R^4$ is methyl Q is selected from a group consisting of —$OR^1$ and —OH; Z is selected from a group consisting of —$R^1$ —H and —Li; y is an integer from three to about 10,000, n is an integer of one to about 50 where the ratio of n to n+y is less than about 0.3, and about 30 to 100 mole percent of the trifluoropropyl substitution is in cis configuration. Preferred $R^1$ and $R^2$ substituents and preferred values for n are as previously described. It is preferred that y be an integer within a range of about 20 to 1000.

Preferred cis stereoregular poly{methyl(3,3,3-trifluoropropyl)siloxane} polymers useful in the present process when the lithium compound is bidirectional are described by formula (3).

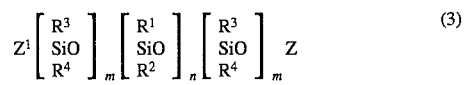  (3)

In formula (3) each $R^1$ is an independently selected monovalent hydrocarbon comprising one to 20 carbon atoms, each $R^2$ is independently selected from a group consisting of $R^1$ and 3,3,3-trifluoropropyl, $R^3$ is 3 3 3-trifluoropropyl, $R^4$ is methyl, each Z is selected from a group consisting of —$R^1$, —H, and —Li. each $Z^1$ is independently selected from a group consisting of —$OR^1$, —OH, and —OLi; n is an integer of one to about 50 where the ratio of n to n+2m is less than about 0.3, each m is an integer from 3 to about 5,000 and 2m is ≦10,000, and about 30 to 100 mole percent of the trifluoropropyl substitution is in cis configuration. Preferred $R^1$ and $R^2$ substituents and preferred values for n are as previously described. It is preferred that each m be within a range of about 50 to 500.

The cis stereoregular polymers prepared as described above are cross-linked to form elastomers which strain-crystallize when stretched. In the present process for making the elastomer, the cis stereoregular polymers must have at least 30 mole percent of trifluoropropyl substitution in cis configuration. Preferred is when the stereoregular polymer have about 40 to 58 mole percent of trifluoropropyl substitution in cis configuration.

To form the strain-crystallizing elastomer of the present invention, polymers prepared as described above are cross-linked to provide an average of greater than two cross-links per 100 to 2000 siloxy (i.e. —SiO—) units in the polymer, thereby forming a cross-linked elastomer. In general, the cross-linked density can be estimated as the average number of polymer repeat units per polymer chain divided by the number of cross-linkable functional groups per polymer chain. The cross-linking may be accomplished, for example, by standard means known in the art and standard means as described herein.

To facilitate cross-linking of the polymers described herein, the polymers may also be the product of the copolymerization of cyclotrisiloxane isomers of 1,3,5-trimethyl-1,3,5-tris(3',3',3'-trifluoropropyl)cyclotrisiloxane and about 0.05 to 5.0 mole percent of an organocyclotrisiloxane comprising at least one reactive substituent bonded to silicon per organocyclotrisiloxane molecule. The reactive substituent bonded to silicon atoms of the organocyclotrisiloxane can be for example hydrogen or an alkenyl radical such as vinyl, allyl, and hexenyl. The organocyclotrisiloxane can be, for example, 1,3,5-trimethyl- 1,3,5-vinylcyclotrisiloxane and 1,3,5-trimethylcyclotrisiloxane. These copolymers can then be cross-linked to make strain-crystallizing poly{methyl(3, 3,3-trifluoropropyl)siloxane} copolymer elastomers. The method for making these cross-linked copolymer elastomers are the same as those described above for making the strain-crystallizing poly{methyl(3,3,3-trifluoropropyl)siloxane} elastomer.

Cross-linking of the cis stereoregular polymers and copolymers can be effected by standard methods known in the art, for example, by heat curing or room temperature vulcanization employing suitable catalyst and cross-linking agents. Examples of such curing mechanisms are provided in, for example, Rubber Chemistry and Technology, Rubber Reviews For. 1979, Vol. 52 (No. 3) pages 447–454.

Generally, it is preferred that the polymer or copolymer to be cross-linked be reacted with a weak organic acid, such as glacial acetic acid to remove the lithium from the polymer ends and provide hydroxy end-terminated polymers. The hydroxy end-terminated polymers can then be cross-linked by standard methods known in the art.

The hydroxy end-terminated polymers can be cross-linked by for example using an organohydrosiloxane as cross-linker and a metal catalyst such as a compound of tin. The catalyst can be for example tin octoate, dibutyltin diacetate, dibutyltin dioctoate, and dibutyltin dilaurate.

The hydroxy-end terminated polymers can be cross-linked by reaction with alkyltrialkoxysilanes or tetraalkoxysilanes such as $MeSi(OMe)_3$, $(EtO)_4Si$, $(n-PrO)_4Si$, and $(MeOCH_2CH_2O)_4Si$, using a tin catalyst such as described above, where Me is methyl, Et is ethyl, and Pr is propyl.

The hydroxy-end terminated polymers can be cross-linked by reaction with alkyltrialkoxysilanes or tetraalkyoxysilanes as described above in the presence of titanate catalysts such as $Ti(OMe)_4$.

The hydroxy-end terminated polymers can be cross-linked by reaction with siloxane or silane cross-linkers containing acetoxy functionality, for example, $EtSi(OAc)_3$, $MeSi(OAc)_3$, and $ViSi(OAc)_3$, where a tin catalyst such as dibutyltin diacetate is employed and Ac is acetyl and Vi is vinyl.

The hydroxy-end terminated polymers can be cross-linked by reaction with silane or siloxane cross-linkers containing oxime functionality and a tin compound catalyst. For example the cross-linker can be $Me(MeEtC=NO)_3Si$, $(MeEtC=NO)_4Si$, or $Vi(MeEtCH=O)_3Si$, and the catalyst can be dibutyltin diacetate.

The hydroxy-end terminated polymers can be cross-linked by means of acetamide functional silane and siloxane cross-linkers and chain extenders.

The cis stereoregular polymers can contain small amounts of vinyl substitution on silicon and cross-linking of these polymers can be effected by a hydrosilation reaction where the vinyl groups are reacted with siloxane and silane cross-linkers having hydrogen bonded directly to silicon. Examples of these type of cross-linkers are typified by $(HMe_2SiO)_4Si$, $Me_3SiO(Me_2SiO)_a(MeHSiO)_bSiMe_3$, and $(MeHSiO)_c$, where a is typically an integer from zero to about 20, b is typically an integer from two to about 20, and c is typically an integer from three to about 20. Typical catalysts for the hydrosilation reaction are, for example, complexes of platinum with vinyl silanes such as $(CH_2=CH)Me_2Si)_2O$ and can include for example $Pt\{((CH_2=CH)Me_2Si)_2O\}$ $(CH_3CH_2CH_2)_2$, and $Pt_2\{((CH_2=CH)Me_2Si)_2O\}_3$; and compounds of platinum such as $PtAc_2$, $H_2PtCl_6$, and $PtCl_2(Bu_2S)_2$.

The cis stereoregular polymers may have small amounts of vinyl substitution on the silicon atoms and cross-linking can be effected by free-radical initiators such as peroxides, whereby small amounts of vinyl groups included in the polymer chain as substituent on silicon are coupled to silicon bonded methyl groups from which a hydrogen has been extracted. Such cross-linking can take place with or without the addition of siloxane cross-linker.

The cis stereoregular copolymers made by the present process can be cross-linked by similar methods as described for the polymers, thereby providing an elastomer where at least a portion of the cross-links in the elastomer are effected by reaction of the reactive substituent of silicon of the organocyclotrisiloxane employed in the copolymerization procedure.

Those skilled in the art will recognize that elastomers prepared by the present process may also containing additives such as fillers, reinforcing agents, pigments, and antioxidants.

The following examples are provided to illustrate the present invention. These examples are not intended to limit the scope of the present claims.

Cis and trans isomers of 1,3,5-trimethyl-1,3,5tris(3',3',3'-trifluoropropyl)cyclotrisiloxane (hereinafter cis-$F_3$ and trans-$F_3$) were isolated by the following method for use in the Examples. A mixture containing cis-$F_3$ and trans-$F_3$ was filtered at room temperature to remove crystallized trans-$F_3$. The filtrate was retained and was the source for subsequent isolation of cis-$F_3$ as described below.

The filtered solids were recrystallized three times from a 20 weight percent solution in hexane at 5° C. and filtered in chilled equipment to give needles consisting of greater than 99% trans-$F_3$ as determined by gas chromatography (GC). The needles were determined to have a melting point of 35° C. by differential scanning calorimetry (DSC). Proton decoupled $^{19}F$ NMR of the isolated material (600 MHz, acetone-$d_6$, $C_6H_5F$) gave: δ–69.74 (s, 3F, $CF_3$); –69.68 (s, 6F, $CF_3$).

The filtrate containing cis-$F_3$ was repeatedly cooled in stages to –25° C. and filtered at each stage. The solid precipitates were discarded while the filtrates were saved. During filtration the cold dispersions were kept below 0° C. composition of the filtrates was monitored by GC and melting transitions by DSC. The lower melting transition was relatively stable at –7° C. and converged with a second decreasing upper transition as the filtrate became enriched with cis-$F_3$. Eventually the filtrate reached a composition of about 85% cis-$F_3$ which appeared to be eutectic.

Further separation of the mixture enriched in cis-$F_3$ was achieved by rapidly cooling the eutectic mixture to the temperature of a liquid nitrogen-acetone slush, warming to –3° C. and annealing the residual crystals. These were separated in a chilled filtration apparatus. This process was repeated five to six times giving a material that was greater than about 96% cis-$F_3$, as determined by GC, and having a melting point of –1.9° C., as determined by DSC. Proton decoupled $^{19}F$ NMR of the isolated material (600 MHz, acetone-$d_6$, $CFCl_3$) gave: δ–68.29 (s, 9F, $CF_3$).

Initiators used in the examples were prepared as follows. Dilithium diphenylsilanolate (Initiator I) was prepared under vacuum. A solution of 2.09 g diphenylsilanediol in dry tetrahydrofuran (THF) was added with stirring to 13.1 mL of 1.55 molar n-butyllithium in hexane for about 20 to 30 minutes. The solvent (THF and hexane) was evaporated and the solid was washed with hexane. The hexane was decanted and the residual hexane was evaporated under vacuum. The solid was then dispersed in benzene and insoluble material separated by centrifugation. The supernatant was stored in nitrogen filled sealed containers until used.

Initiator II was prepared under vacuum by adding 25 mL of tetrahydrofuran (THF) to 5.0 g of $LiOH.H_2O$, which had been previously heated at 100° C. for about one hour under vacuum. This mixture was then combined with 20.2 g of 1,3,5-trimethyl-1,3,5-tris(3',3',3'-trifluoropropyl)cyclotrisiloxane isomers in 25 mL of THF and 2.2 g of water. The mixture was refluxed in a closed evacuated reactor for 2.5 hours. The resultant dispersion was decanted from the solids and solvent was evaporated under vacuum. The liquid initiator was mixed with 7.0 mL of THF. Prior to use the solids were separated by centrifugation and the clear solution was stored in nitrogen-filled sealed containers.

In the examples, analyses were performed as follows. The ratios of cis-$F_3$ to trans-$F_3$ were determined by $^{13}C$ NMR. Differential scanning calorimetry (DSC) was used to determine glass transitions ($T_g$) and melt transitions ($T_m$). Molecular weights and molecular weight distributions were determined by gel permeation chromatography using a refractive index detector. Tensile testing was conducted on an Instron tester with a pull rate of 50 mm/min. at a temperature of about 23° C.

Example 1. Dilithium diphenylsilanolate (Initiator I) was used as an initiator to effect the polymerization of a $^{40}/_{60}$ cis/trans mixture of 1,3,5-dimethyl-1,3,5-tris(3',3',3'-trifluoropropyl)cyclotrisiloxane.

A 9.95 g mixture of 40/60 cis-$F_3$/trans-$F_3$ was degassed under vacuum to remove traces of moisture and other volatile impurities, then dissolved in a solvent comprising 20 mL of methylene chloride and 2 mL of THF. Polymerization was initiated by injecting into a reactor containing the mixture, with stirring, 0.28 mL of a 0.71 molar solution of dilithium diphenylsilanolate. The reactor was maintained at a temperature of about 22° C. After 12 hours the reaction was terminated by injecting five drops of glacial acetic acid into the reactor. The content of the reactor was washed with 50 mL of water and the solvent was evaporated under vacuum to give a 92 weight percent yield of polymer The polymer had a $T_g$=−67.7° C. $T_m$=−8.3° C., Mn/1000=94.6, and an Mw/Mn=1.38.

Example 2. The polymer of Example 1 was cross-linked with tetraethylorthosilicate, using stannous octoate as catalyst, to form an elastomer which exhibited reinforcement by strain-induced crystallization. A blend was prepared of 100 pph (parts per hundred) polymer, 2 pph tetraethylorthosilicate, and 0.05 pph of stannous octoate diluted to 20% in methylene chloride. This blend was transferred to a 50×70×2 mm chase and cured at room temperature for six days while exposed to the atmosphere. The resulting elastomer slab was removed from the chase and swollen in THF to remove residual catalyst, free polymer, and low molecular weight species. The swollen elastomer was then deswollen gradually using mixtures of THF and methanol with progressively increasing amounts of methanol. The elastomer slab was dried under vacuum to a constant weight. Testing of the slab gave the following: $T_g$=−67.7° C., $T_m$=−0.8° C., strain at break=1438%, and stress at break=182 psi.

Example 3. Polymers with various ratios of cis-$F_3$ to trans-$F_3$ were prepared, evaluated, cross-linked, and the physical properties of the resultant elastomers determined.

various mixtures of cis-$F_3$ and trans-$F_3$, as described in Table 1, were degassed by heating to 100° C. for 10 minutes under vacuum to remove traces of moisture. Then 30 g of the mixture was transferred to a reactor. After the mixture cooled to room temperature, 30 mL of dried methylene chloride and 3.0 mL of THF were transferred to the reactor. Lithium initiator solution, as described in Table 1, was added to the reactor. The amount of initiator used was based on the target molecular weight (M), where M=2(weight of monomer)/equivalents of lithium. In the provided examples, calculated molecular weight equals the target molecular weight times the conversion of monomer. The mixtures were stirred at about 22° C. for about six hours. At the end of about six hours the conversion of cyclic trimer was 80–95 mole percent and no by-produced large ring cyclosiloxanes were detected Dy GC. The reactions were terminated by injecting a two-fold excess of acetic acid over the equivalents of lithium introduced by the initiator. The resulting polymer solution was washed three times with water and the solvent was evaporated. The polymer was redissolved in THF and precipitated with a 5-fold volume excess of methanol. The resulting polymers where dried in a vacuum at 75° C. overnight. The polymers were analyzed as described above and the results are presented in Table 1.

TABLE 1

Physical Properties of Polymers

| No. | Cis/Trans Ratio | Init. Type | Yield (Wt %) | M/1000 | Mn/1000 | Mw/Mn | Tg (°C.) | Tm (°C.) | $\Delta H_f$ (J/g) |
|---|---|---|---|---|---|---|---|---|---|
| 1 | 40/60 | I | — | 81 | 94.4 | 1.25 | −67.3 | 7.8 | 5.5 |
| 2 | 0/100 | I | 75.4 | 116 | 197.3 | 1.26 | −68.6 | 2.8 | 2.1 |
| 3 | 46/54 | I | 96.5 | 60 | 58.7 | 1.12 | −68.3 | 10.9 | 6.5 |
| 4 | 46/54 | I | 79.8 | 176 | 189.8 | 1.07 | −67.3 | 7.3 | 4.9 |
| 5 | 60/40 | I | 93.2 | 90 | 86.0 | 1.15 | −69.1 | 8.2 | 9.1 |
| 6 | 61/39 | I | 86.1 | 62 | 44.4 | 1.08 | −64.4 | 32.5 | 11.5 |
| 7 | 0/100 | II | 86.1 | 75 | 56.3 | 1.14 | −66.4 | * | * |

*No melting detected.

Example 4. Polymers prepared as described in Example 3 were cross-linked and tested as described in Example 1. The tensile properties of the resulting elastomers are presented in Table 2.

TABLE 2

Tensile Properties of Elastomers

| Elastomer No. | Cis/Trans ratio | Breaking Stress (psi) | Breaking Strain (%) | Work to Break in-lb |
|---|---|---|---|---|
| 1 | 40/60 | 326 | 1543 | 7.5 |
| 2 | 0/100 | 38 | 1052 | 1.7 |
| 3 | 46/54 | 336 | 1257 | 7.7 |
| 4 | 46/54 | 384 | 1716 | 12.8 |
| 5 | 60/40 | 285 | 1020 | 6.9 |
| 6 | 61/39 | 513 | 829 | 8.3 |
| 7 | 0/100 | 49 | 709 | 1.0 |

Example 5. A polymer having a 46/54 ratio of cis-$F_3$ to trans-$F_3$ was prepared, vinyl end-terminated, and cross-linked by hydrosilation using a platinum catalyst.

A polymer having a 46/54 ratio of cis-$F_3$ to trans-$F_3$ was prepared, using initiator II, by methods similar to those described in Example 3. The physical properties of the polymer were M/1000=149, Mn/1000=51.8, Mw/Mn=1.05, Tg(°C)=−69.0, Tm(°C)=17.5, and $\Delta H_f$(J/g)=6.4. The polymer was reacted with acetic acid to provide hydroxy end-terminated polymer.

The hydroxy end-terminated polymer was heated at 100° C. under vacuum for about 30 minutes to remove traces of water and volatile impurities. The polymer was then dissolved in 14 mL of dry methylene chloride and 0.326 g of chlorodimethylvinylsilane was added followed by 0.274 g of dry triethylamine. The resultant mixture was stirred under vacuum for five hours, then washed four times with water. Solvent was evaporated from the mixture under vacuum at room temperature. The resulting polymer was dissolved in 20 mL of THF and then the polymer was precipitated by adding 200 mL of methanol. The precipitate was washed with methanol and dried in a vacuum at room temperature. The resulting polymer had a Mn of 52,700.

The above prepared vinyl end-terminated polymer was cross-linked by mixing 5.17 g of the polymer with 0.40 g of tetrakisdimethylsiloxysilane and 0.0055 g of a vinyl platinum complex catalyst. This mixture was degassed and transferred to a 50×70×3 mm chase and cured for three days at room temperature. The resulting elastomer was post cured at 135° C. for two hours. The post-cured elastomer had a breaking stress of 987 psi at 1108% strain.

Example 6. A hydroxy end-terminated polymer having a $^{84}/_{16}$ ratio of cis-$F_3$ to trans-$F_3$ was prepared, vinyl end-terminated, and cross-linked using a peroxide catalyst.

A hydroxy end-terminated polymer having a $^{84}/_{16}$ ratio of cis-$F_3$ to trans-$F_3$ was prepared by methods similar to those described in Example 3. The physical properties of the polymer Mn/1000=54.6 and Mw/Mn=1.08.

The hydroxy end-terminated polymer was then vinyl end-terminated by the method described in Example 5 using 0.26 g of chlorodimethylvinylsilane and 0.22 g of triethylamine. The vinyl end-terminated polymer was isolated by a method similar to that described in Example 5. The polymer's physical properties were Mn/1000=55.2, Mw/Mn=1.07, Tm=37.3° C., and $\Delta H_f$=11.3 J/g.

About 4.2 g of the above prepared vinyl end-terminated polymer was mixed with 0.021 g of 2,5-dimethyl-2,5-bis(t-butylperoxy)hexane. This mixture was degassed and transferred to a 50×70×3 mm chase and cured for 15 minutes at 170° C. The resulting elastomer was post cured at 200° C. for 20 minutes. The post-cured elastomer had the following physical properties: Tm=26° C., $\Delta H_f$=9.0 J/g, tensile strength at break=373 psi, and strain at break=520%.

We claim:

1. A strain-crystallizing elastomer comprising cross-linked poly{methyl(3,3,3-trifluoropropyl)siloxane} polymers having an average of greater than two cross-links per 100 to 4,000 siloxy units in the polymers and where at least 30 mole percent of 3,3,3-trifluoropropyl groups of the polymers are in cis configuration.

2. A strain-crystallizing elastomer according to claim 1, where 40 to 85 mole percent of 3,3,3-trifluoropropyl groups of the polymers are in cis configuration.

3. A strain crystallizing elastomer according to claim 2, comprising cross-linked poly{methyl(3,3,3-trifluoropropyl)siloxane} polymers described by formula

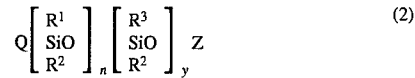 (2)

or described by formula

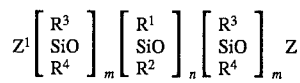

where each $R^1$ is an independently selected monovalent hydrocarbon comprising one to 20 carbon atoms, each $R^2$ is independently selected from a group consisting of $R^1$ and 3,3,3-trifluoropropyl, $R^3$ is 3,3,3-trifluoropropyl, $R^4$ is methyl, Q is selected from a group consisting of —$OR^1$ and —OH; Z is selected from a group consisting of —$R^1$, —H and —Li; $Z^1$ is selected from a group consisting of —$OR^1$, —OH and —OLi; y is an integer from three to about 10,000, m is an integer from three to about 5,000 and 2m is ≦10,000, n is an integer of one to about 50, the ratio of n to n+y is less than about 0.3, and the ratio of n to n+2m is less than about 0.3.

4. A strain-crystallizing elastomer according to claim 3, where y=20 to 1000 and n=1 to 10.

5. A strain-crystallizing elastomer according to claim 4, where each $R^1$ is independently selected from a group consisting of methyl, phenyl, and 3,3,3-trifluoropropyl, each $R^2$ is independently selected from a group consisting of methyl, phenyl, and 3,3,3-trifluoropropyl, and both Q and Z are —OH.

6. A strain-crystallizing elastomer according to claim 3, where each m=10 to 500 and n=1 to 10.

7. A strain-crystallizing elastomer according to claim 6, where each $R^1$ is independently selected from a group consisting of methyl, phenyl, and 3,3,3-trifluoropropyl, each $R^2$ is independently selected from a group consisting of methyl, phenyl, and 3,3,3-trifluoropropyl, and Z is —OH.

8. A strain-crystallizing elastomer according to claim 3, where the polymers are cross-linked by a cross-linker and catalyst combination selected from a group consisting of an organohydrosiloxane as a cross-linker and a catalyst selected from a group consisting of compounds of tin, palladium and platinum; an alkyltrialkoxysilane or tetraalkoxysilane as cross-linker and a catalyst selected from a group consisting of compounds of tin and organotitanates; a siloxane or silane cross-linker having acetoxy functionality and a tin compound catalyst; a siloxane or silane cross-linker having oxime functionality and a tin compound catalyst; and a siloxane or silane having acetamido functionality.

9. A strain-crystallizing elastomer according to claim 3, where the polymers are cross-linked by a hydrosilation reaction where alkenyl substituents substituted on silicon atoms of the polymer are reacted with a cross-linker selected from a group consisting of siloxanes and silanes having hydrogen bonded to silicon, in the presence of a catalyst selected from a group consisting of platinum compounds and platinum complexes.

10. A strain-crystallizing elastomer according to claim 9, where the catalyst is a complex of platinum with a vinylsilane.

11. A strain-crystallizing elastomer according to claim 3, where the polymers have alkenyl substituents on silicon and the polymers are cross-linked by use of a free-radical initiator.

12. A strain-crystallizing elastomer according to claim 11, where the free-radical initiator is a peroxide.

* * * * *